(12) United States Patent
Finerman et al.

(10) Patent No.: US 7,838,589 B2
(45) Date of Patent: Nov. 23, 2010

(54) SEALANT MATERIAL

(75) Inventors: Terry Finerman, Rochester Hills, MI (US); Abraham Kassa, Shelby Township, MI (US)

(73) Assignee: Zephyros, Inc., Romeo, MI (US)

(*) Notice: Subject to any disclaimer, the term of this patent is extended or adjusted under 35 U.S.C. 154(b) by 845 days.

(21) Appl. No.: 11/686,487

(22) Filed: Mar. 15, 2007

(65) Prior Publication Data

US 2007/0193171 A1    Aug. 23, 2007

Related U.S. Application Data

(63) Continuation-in-part of application No. 11/188,010, filed on Jul. 18, 2005, now Pat. No. 7,521,093.

(60) Provisional application No. 60/589,701, filed on Jul. 21, 2004.

(51) Int. Cl.
C08F 220/14 (2006.01)
C08F 210/02 (2006.01)
C08F 218/08 (2006.01)

(52) U.S. Cl. .................. 524/560; 524/563; 522/100; 522/102

(58) Field of Classification Search .............. 524/560, 524/563; 522/100, 102
See application file for complete search history.

(56) References Cited

U.S. PATENT DOCUMENTS

| | | | |
|---|---|---|---|
| 3,868,796 A | 3/1975 | Bush | |
| 4,378,395 A | 3/1983 | Asoshina et al. | |
| 4,427,481 A | 1/1984 | Smith et al. | |
| 4,444,818 A | 4/1984 | Tominaga et al. | |
| 4,538,380 A | 9/1985 | Colliander | |
| 4,605,460 A | 8/1986 | Schirmer | |
| 4,693,775 A | 9/1987 | Harrison et al. | |
| 4,724,243 A | 2/1988 | Harrison | |
| 4,749,434 A | 6/1988 | Harrison | |
| 4,769,166 A | 9/1988 | Harrison | |
| 4,898,630 A | 2/1990 | Kitoh et al. | |
| 4,922,596 A | 5/1990 | Wycech | |
| 4,923,902 A | 5/1990 | Wycech | |
| 4,978,562 A | 12/1990 | Wycech | |
| 4,995,545 A | 2/1991 | Wycech | |
| 5,124,186 A | 6/1992 | Wycech | |
| 5,266,133 A | 11/1993 | Hanley et al. | |
| 5,274,006 A | 12/1993 | Kagoshima et al. | |
| 5,470,886 A | 11/1995 | Makhlouf et al. | |

(Continued)

FOREIGN PATENT DOCUMENTS

EP     0 061 131 A2    9/1982

(Continued)

OTHER PUBLICATIONS

"Epoxy Resins", Second Edition Encyclopedia of Polymer Science and Engineering, vol. 6, pp. 322-382, 1985.

(Continued)

Primary Examiner—Satya B Sastri
(74) Attorney, Agent, or Firm—Dobrusin & Thennisch PC

(57) ABSTRACT

There is disclosed a sealant material for providing sealing to a substrate and preferably an interface. The sealant material may also include a material, shape, ingredient or otherwise for inhibiting the flow of bubbles throught the material.

20 Claims, 6 Drawing Sheets

U.S. PATENT DOCUMENTS

| | | |
|---|---|---|
| 5,577,784 A | 11/1996 | Nelson |
| 5,648,401 A | 7/1997 | Czaplicki |
| 5,712,317 A | 1/1998 | Makhlouf et al. |
| 5,783,272 A | 7/1998 | Wong |
| 5,806,919 A | 9/1998 | Davies |
| 5,851,626 A | 12/1998 | McCorry et al. |
| 5,884,960 A | 3/1999 | Wycech |
| 5,894,071 A | 4/1999 | Merz et al. |
| 5,931,474 A | 8/1999 | Chang et al. |
| 5,932,680 A | 8/1999 | Heider |
| 5,948,508 A | 9/1999 | Pastore et al. |
| 5,964,979 A | 10/1999 | George et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A | 2/2000 | Johnson et al. |
| 6,040,350 A | 3/2000 | Fukui |
| 6,056,526 A | 5/2000 | Sato |
| 6,057,382 A | 5/2000 | Karim et al. |
| 6,077,884 A | 6/2000 | Hess et al. |
| 6,096,791 A | 8/2000 | Born et al. |
| 6,103,784 A | 8/2000 | Hilborn et al. |
| 6,133,335 A | 10/2000 | Mahoney et al. |
| 6,136,398 A | 10/2000 | Willett et al. |
| 6,136,944 A | 10/2000 | Stewart et al. |
| 6,153,302 A | 11/2000 | Karim et al. |
| 6,162,504 A | 12/2000 | Hubert et al. |
| 6,174,932 B1 | 1/2001 | Pachl et al. |
| 6,197,403 B1 | 3/2001 | Brown et al. |
| 6,218,442 B1 | 4/2001 | Hilborn et al. |
| 6,228,449 B1 | 5/2001 | Meyer |
| 6,232,433 B1 | 5/2001 | Narayan |
| 6,235,842 B1 | 5/2001 | Kuwano et al. |
| 6,244,601 B1 | 6/2001 | Buchholz et al. |
| 6,263,635 B1 | 7/2001 | Czaplicki |
| 6,277,898 B1 | 8/2001 | Pachl et al. |
| 6,287,669 B1 | 9/2001 | George et al. |
| 6,291,059 B1 | 9/2001 | Mahoney et al. |
| 6,296,298 B1 | 10/2001 | Barz et al. |
| 6,303,672 B1 | 10/2001 | Papalos et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 * | 2/2002 | Feichtmeier et al. .......... 522/81 |
| 6,376,564 B1 | 4/2002 | Harrison |
| 6,419,305 B1 | 7/2002 | Larsen |
| 6,429,244 B1 | 8/2002 | Rinka et al. |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,150 B1 | 9/2002 | Sheppard et al. |
| 6,455,476 B1 | 9/2002 | Imai et al. |
| 6,467,834 B1 | 10/2002 | Barz et al. |
| 6,471,285 B1 | 10/2002 | Czaplicki et al. |
| 6,479,560 B2 | 11/2002 | Freitag et al. |
| 6,482,486 B1 | 11/2002 | Czaplicki et al. |
| 6,482,496 B1 | 11/2002 | Wycech |
| 6,485,589 B1 | 11/2002 | Johnson et al. |
| 6,486,256 B1 | 11/2002 | Tarbutton et al. |
| 6,489,023 B1 | 12/2002 | Shinozaki et al. |
| 6,506,494 B2 | 1/2003 | Brandys et al. |
| 6,561,571 B1 | 5/2003 | Brennecke |
| 6,573,309 B1 | 6/2003 | Reitenbach et al. |
| 6,607,831 B2 | 8/2003 | Ho et al. |
| 6,620,501 B1 | 9/2003 | Kassa et al. |
| 6,634,698 B2 | 10/2003 | Kleino |
| 6,668,457 B1 | 12/2003 | Czaplicki |
| 6,682,818 B2 | 1/2004 | Czaplicki et al. |
| 6,706,772 B2 | 3/2004 | Czaplicki et al. |
| 6,720,387 B1 | 4/2004 | Stark et al. |
| 6,740,379 B1 | 5/2004 | Congard et al. |
| 6,740,399 B1 | 5/2004 | George et al. |
| 6,742,258 B2 | 6/2004 | Tarbutton et al. |
| 6,747,074 B1 | 6/2004 | Buckingham et al. |
| 6,753,379 B1 | 6/2004 | Kawate et al. |
| 6,774,171 B2 | 8/2004 | Kassa et al. |
| 6,787,605 B2 | 9/2004 | Clough et al. |
| 6,797,371 B1 | 9/2004 | Gehlsen et al. |
| 6,811,864 B2 | 11/2004 | Czaplicki et al. |
| 6,894,082 B2 | 5/2005 | Branti et al. |
| 6,991,237 B2 | 1/2006 | Kassa et al. |
| 7,169,467 B2 | 1/2007 | Wilson et al. |
| 7,199,165 B2 * | 4/2007 | Kassa et al. ................. 521/135 |
| 2002/0009582 A1 | 1/2002 | Golden |
| 2002/0120064 A1 | 8/2002 | Khandpur et al. |
| 2002/0123575 A1 | 9/2002 | Kato et al. |
| 2002/0136891 A1 | 9/2002 | Khandpur et al. |
| 2002/0137808 A1 | 9/2002 | Gehlsen et al. |
| 2002/0187305 A1 | 12/2002 | Czaplicki et al. |
| 2003/0187129 A1 | 10/2003 | Bell et al. |
| 2004/0016564 A1 | 1/2004 | Lambert, Jr. |
| 2004/0033324 A1 | 2/2004 | Meyer |
| 2004/0048078 A1 | 3/2004 | Czaplicki et al. |
| 2004/0197545 A1 | 10/2004 | Gehlsen et al. |
| 2004/0229000 A1 | 11/2004 | Khandpur |
| 2005/0003222 A1 | 1/2005 | Everaerts et al. |

FOREIGN PATENT DOCUMENTS

| | | |
|---|---|---|
| EP | 0 236 291 A2 | 2/1986 |
| EP | 0 442 178 A1 | 8/1991 |
| EP | 0 775 721 A1 | 5/1997 |
| EP | 1 022 320 A1 | 7/2000 |
| EP | 0 703 931 B1 | 10/2003 |
| EP | 0 742 814 B1 | 1/2004 |
| EP | 1 240 266 B1 | 2/2004 |
| EP | 0 820 493 B1 | 8/2004 |
| EP | 1 185 595 B1 | 8/2004 |
| EP | 0820491 B1 | 8/2004 |
| EP | 1 471 105 A2 | 10/2004 |
| EP | 1 001 893 B1 | 11/2004 |
| EP | 1 187 888 B1 | 11/2004 |
| GB | 2 061 196 A | 5/1981 |
| JP | 4059820 | 2/1992 |
| WO | WO 95/33785 | 12/1995 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 99/08854 | 2/1999 |
| WO | WO 99/36243 | 7/1999 |
| WO | WO 99/50057 | 10/1999 |
| WO | WO 99/61216 | 12/1999 |
| WO | WO 99/61281 | 12/1999 |
| WO | WO 00/12595 | 3/2000 |
| WO | WO 00/13876 | 3/2000 |
| WO | WO 00/13958 | 3/2000 |
| WO | WO 00/20483 | 4/2000 |
| WO | WO 00/27920 | 5/2000 |
| WO | WO 00/37242 | 6/2000 |
| WO | WO 00/37243 | 6/2000 |
| WO | WO 00/37554 | 6/2000 |
| WO | WO 00/39232 | 7/2000 |
| WO | WO 00/40629 | 7/2000 |
| WO | WO 00/46461 | 8/2000 |

| | | |
|---|---|---|
| WO | WO 00/52086 | 9/2000 |
| WO | WO 00/68041 | 11/2000 |
| WO | WO 01/57130 | 8/2001 |
| WO | WO 01/88033 | 11/2001 |
| WO | WO 02/086003 | 10/2002 |
| WO | WO 03/011954 A1 | 2/2003 |
| WO | WO 03/040251 | 5/2003 |
| WO | WO 03/072677 | 9/2003 |
| WO | WO 03/078163 | 9/2003 |
| WO | WO 03/010392 | 12/2003 |
| WO | WO 03/103921 | 12/2003 |
| WO | WO 2004/037509 | 5/2004 |

OTHER PUBLICATIONS

International Search Report dated Oct. 9, 2002. PCT/US02/23957 (101.067WO).

Dvorko. "One-Part Epoxy Compounds and Derived Foam Plastics", published Apr. 13, 2004.

Weber et al., "Requirements for Improved Performance of Specialty Sealing and Bonding Materials for Automotive Applications", SAE 2000 World Congress, Mar. 6-9, 2000.

Co-pending U.S. Appl. No. 12/048,684, filed Mar. 14, 2008.

Co-pending U.S. Appl. No. 11/188,010, filed Jul. 18, 2005.

* cited by examiner

SEALANT MATERIAL

RELATED APPLICATIONS

This application is a continuation-in-part of U.S. patent application Ser. No. 11/188,010, filed on Jul. 18, 2005, now U.S. Pat. No. 7,521,093, which in turn claims benefit of U.S. provisional application No. 60/589,701, filed Jul. 21, 2004.

FIELD OF THE INVENTION

The present invention relates to a sealant material for sealing a component of an article of manufacture such as an automotive vehicle.

BACKGROUND OF THE INVENTION

Sealant materials are often applied to a surface for sealing or for otherwise covering the surface, including any joints associated therewith. There presently exist a vast number of sealant materials that serve these purposes for different articles of manufacture. However, in certain circumstances, it may be desirable for sealant materials to serve other additional purposes depending on the components or articles of manufacture to which the sealant materials are applied.

For example, in some industries, such as the furniture, appliance or automotive industries, joints are often part of a show surface, and are thus visible to a user or consumer. Accordingly, one desirable characteristic for a sealant material covering a joint is to provide a generally smooth or continuously or controlled patterned surface that is cosmetically pleasing. If colorant is not already included in the sealant, but a color is desirable, preferably the sealant material is paintable or otherwise coatable.

As another example, it may be desirable for a sealant material to be compatible with other components of an article of manufacture. For instance, it may be desirable for a sealant material to provide a relatively smooth and consistent surface such that a component of an article of manufacture may be contacted with that sealant material without surface inconsistencies of the sealant material showing or reading through the component.

Certain assembly operations in the aforenoted industries and others, require that a sealant material be heated along with the article to which it is applied. For instance, some priming or painting operations are conducted at elevated temperatures. Thus, another desirable trait for certain sealants is that they exhibit attractive temperature response characteristics for a desired application (e.g., a sealant material preferably does not exhibit random oozing, bubbling, rippling, or the like).

SUMMARY OF THE INVENTION

A sealant material and method of using the sealant material are disclosed. The sealant material is typically activatable to flow, cure, expand or a combination thereof upon exposure to a condition such as heat. Preferably, the sealant material includes an ingredient, shape, configuration or otherwise for inhibiting the flow of bubbles through the sealant material during activation thereof.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1A:
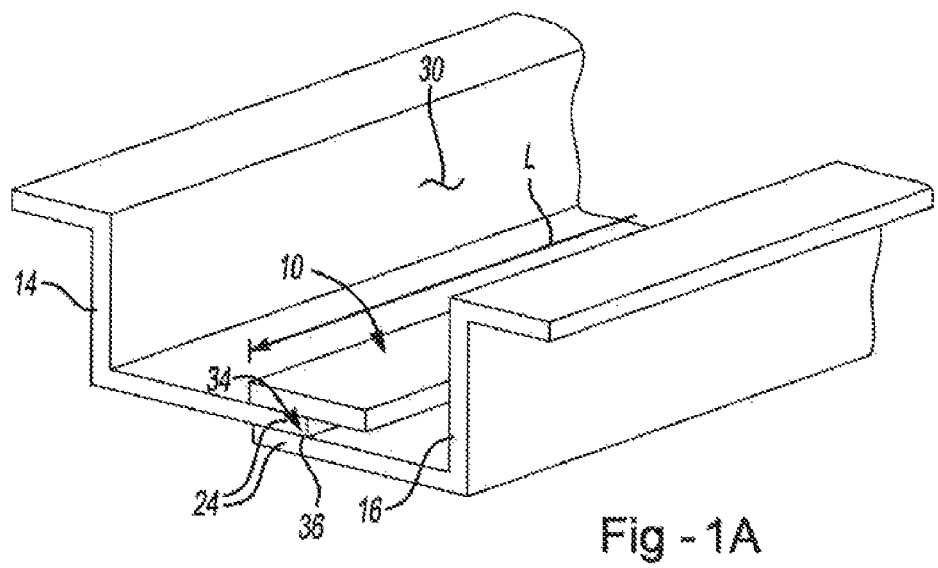
FIG. 1A illustrates a perspective view of an exemplary sealant material formed according to the present invention and disposed upon an exemplary substrate.

The present invention is predicated upon the provision of an improved sealant material and articles incorporating the same. The sealant material may include any combination of formulation improvements or design improvements disclosed herein. For example, and without limitation, the sealant material may include: a hardened surface; a tailored surface energy; a layer of blocking material; two or more portions of different material; one or more waxes; a tailored curing rate; particular positioning of the sealant material; masses for blocking bubbles; a coating, combinations thereof, the like or others. As another example, the sealant material may be part of an assembly that is to be assembled to an article of manufacture.

Examples of other sealant materials including physical designs of sealant materials and formulations of sealant materials, both of which may be used in conduction with or as part of the sealant material of the present invention, are disclosed in the following references: U.S. Pat. Nos. 6,350,791; 6,489,023; 6,720,387; 6,742,258; 6,747,074; 2004/0033324; 2004/0016564; WO 02/086003; WO 03/103921; WO 03/072677; WO 03/011954; WO 2004/037509; EP 0 742 814 B1; EP 1 240 266 B1; copending U.S. Provisional Application Ser. No. 60/558,594, filed Apr. 1, 2004, titled "Sealant Material" and copending U.S. Provisional Application Ser. No. 60/577,027, filed Jun. 4, 2004, titled "Sealant Material", all of which are incorporated herein by reference for all purposes.

Referring to FIG. 1, there is illustrated one exemplary basic design of a sealant material 10 that may have an improved formulation according to the present invention. Of course, it should be understood that the formulations disclosed herein may be used in any of the physical designs of any sealant material disclosed herein or any other sealant material.

It is generally contemplated that, the sealant material may be formed in a variety of shapes or configurations. In the embodiment illustrated in FIG. 1, the sealant material 10 is an elongated strip that extends along a length (L) and has a rectangular cross-section perpendicular to that length (L).

The sealant material may be used to cover, seal, reinforce, provide acoustic damping or the like to a variety of members or components of a variety of articles of manufacture. In the embodiment illustrated in FIG. 1, the sealant material 10 is placed within an opening 30 (e.g., a cavity, ditch or recess) that is formed by panels 14, 16. In the particular embodiment illustrated, the opening 30 is a roof ditch of an automotive vehicle that is typically formed from body panels of the vehicle. As shown, the overlapping ends 24 of the panels 14, 16 at least partially define the opening 30 and the overlapping ends 24 form an interface 34 between the two panels 14, 16. Typically, the interface 34 will define one or more gaps 36 between the overlapping ends 24 of the panels 14, 16, even though effort is typically expended to minimize such gaps 36 for articles of manufacture such as automotive vehicles. In the embodiment shown, the sealant material 10 overlays the interface 34.

Figure 1B:
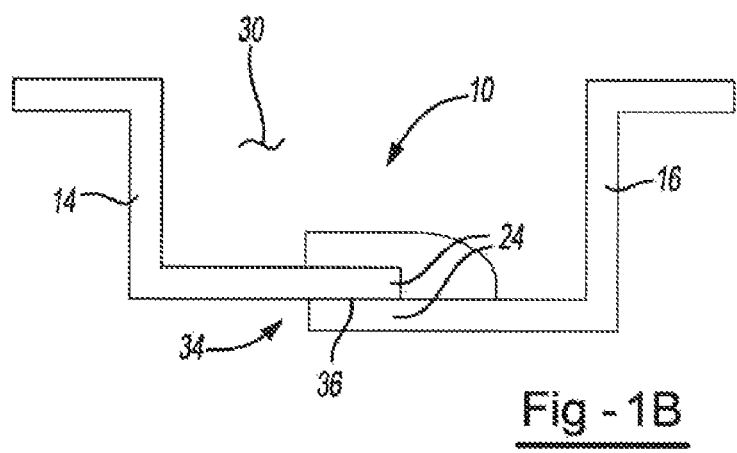
FIG. 1B illustrates a sectional view of the exemplary sealant material and substrate of FIG. 1A after activation of the sealant material.

The expandable material is typically configured to activate upon exposure to a stimulus such as heat or others as discussed below. Upon activation, the sealant material typically softens, melts, cures, possibly expands, a combination thereof or the like. In FIG. 1B, the expandable material 10 has been activated to soften and/or melt such that it flows and whets the substrate or the panels 14, 16 about the interface 34 thereby sealing the interface 34, the gap 36 or both formed by the panels 14, 16.

Generally, it is contemplated that a variety of materials can be employed in the sealant material. Thus, the preferred materials discussed herein should not be considered limiting unless otherwise stated.

Epoxy Materials

Epoxy materials can be particularly suitable for the sealant material of the present invention. Epoxy resin is used herein to mean any of the conventional dimerism, oligomeric or polymeric epoxy materials containing at least one epoxy functional group. The polymer based materials may be epoxy containing materials having one or more oxirane rings polymerizable by a ring opening reaction. In preferred embodiments, the sealant material includes up to about 80% of an epoxy resin. More preferably, the sealant includes between about 10% and 50% by weight of epoxy containing materials.

The epoxy containing materials may be aliphatic, cycloaliphatic, aromatic or the like. The epoxy may be supplied as a solid (e.g., as pellets, chunks, pieces or the like) or a liquid (e.g., an epoxy resin) or both. The epoxy may be blended with one or more ethylene copolymers or terpolymers that may possess an alpha-olefin. As a copolymer or terpolymer, the polymer is composed of two or more different monomers, i.e., small chemically reactive molecules that are capable of linking up with each other or similar molecules. Preferably, an epoxy resin is added to the sealant material to increase the flow properties of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive.

Epoxy/Elastomer

One or more of the epoxy containing materials may be provided to the sealant material as an epoxy/elastomer hybrid, e.g., a blend, copolymer or adduct that has been previously fabricated. The epoxy/elastomer hybrid, if included, may be included in an amount of up to about 90% by weight of the sealant material. Typically, the epoxy/elastomer hybrid is approximately 1 to 50% and more typically is approximately 5 to 20% by weight of the sealant material.

In turn, the hybrid itself generally includes about 1:5 to 5:1 parts of epoxy to elastomer, and more preferably about 1:3 to 3:1 parts or epoxy to elastomer. In one preferred embodiment, the epoxy/elastomer hybrid preferably includes approximately 40 to 80% of an epoxy resin (such as disclosed in the above), and about 20 to 60% of an elastomer compound. The elastomer compound may be any suitable art disclosed thermoplastic elastomer, thermosetting elastomer or a mixture thereof. Exemplary elastomers include, without limitation natural rubber, styrenebutadiene rubber, polyisoprene, polyisobutylene, polybutadiene, isoprene-butadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, EPDM (ethylene propylene diene rubbers), chlorosulphonated polyethylene, fluorinated hydrocarbons and the like. In one embodiment, recycled tire rubber is employed.

The epoxy/elastomer hybrid, when added to the sealant material, preferably is added to modify structural properties of the sealant material such as strength, toughness, stiffness, flexural modulus, or the like. Additionally, the epoxy/elastomer hybrid may be selected to render the sealant material more compatible with coatings such as water-borne paint or primer system or other conventional coatings.

Elastomer

Rubber or elastomer may also be added to the sealant material as a separate ingredient. Again, the elastomer compound may be a thermoplastic elastomer, thermosetting elastomer or a mixture thereof or otherwise. Exemplary elastomers include, without limitation, natural rubber, styrenebutadiene rubber, polyisoprene, polyisobutylene, polybutadiene, isoprene-butadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, EPDM (ethylene propylene diene rubbers), chlorosulphonated polyethylene, fluorinated hydrocarbons and the like. In one embodiment, recycled tire rubber is employed.

In one preferred embodiment, elastomer or rubber, whether added as part of a hybrid or adduct or on its own, is a substantial portion of the sealant material. The elastomer or rubber can be at least 10%, more typically at least 20% and possibly at least 35% or at least 55% by weight of the melt flow material.

Additional Polymers

Several different polymers may be incorporated into the sealant material, e.g., by copolymerization, by blending, or otherwise. For example, without limitation, other polymers that might be appropriately incorporated into the sealant material include halogenated polymers, polycarbonates, polyketones, urethanes, polyesters, silanes, sulfones, allyls, olefins, styrenes, acetates, ethylene vinyl acetates, acrylates, methacrylates, epoxies, silicones, phenolics, rubbers, polyphenylene oxides, terphthalates, or mixtures thereof. Other potential polymeric materials may be or may include include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methylmethacrylate), poly(vinyl acetate), poly(vinylidene chloride), polytetrafluoroethylene, polyisoprene, polyacrylamide, polyacrylic acid, polymethacrylate, and polyacetals.

In one preferred embodiment, the melt flow material includes acrylate copolymer, acetate copolymer or both. In one preferred embodiment, the melt flow material includes ethylene methyl acrylate (EMA), ethylene vinyl acetate (EVA) or a combination thereof. When included, EMA is typically between about 1% and about 70%, more typically between about 30% and about 60% and even more typically between about 44% and about 55% by weight of the melt flow material. A desirable EMA can have a melt index between about 110 and about 150 grams/10 min. (e.g., about 135 grams/10 min.). One preferred EMA is sold under the tradename TC140 and is commercially available from Exxon. When included, EVA is typically between about 1% and about 70%, more typically between about 2% and about 10% and even more typically between about 3% and about 5% by weight of the melt flow material.

It is also contemplated that the sealant mateiral can include one or more isocyanate reactive ingredients (e.g., polyols), which can be reactive with blocked isocyanates. Example of such ingredients and isocyanates are disclosed in U.S. Patent Application, Publication No. 2005/0320027, which is incoporated herein by reference for all purposes.

Rheology Modifier

The sealant material can also include one or more materials for controlling the rheological characteristics of the sealant material over a range of temperatures (e.g., up to about 250° C. or greater).

In one embodiment, any suitable art-disclosed rheology modifier may be used, and thus the rheology modifier may be organic or inorganic, liquid or solid, or otherwise. In one preferred embodiment, the rheology modifier is a polymer, and more preferably one based upon an olefinic (e.g., an ethylene, a butylenes, a propylene or the like), a styrenic (e.g., a styrene-butadiene-containing rubber), an acrylic or an unsaturated carboxylic acid or its ester (such as acrylates, methacrylates or mixtures thereof; e.g., ethylene methyl acrylate (EMA) polymer) or acetates (e.g., EVA). The rheology modifier may be provided in a generally homogeneous state or suitable compounded with other ingredients. It is also contemplated that the various clays, minerals or other materials discussed in relation to fillers below can be employed to modify rheology of the sealant material.

Blowing Agent

Optionally, one or more blowing agents may be added to the sealant material, although for some applications the sealant material will be substantially or entirely devoid of blowing agent or blowing agent accelerator. When used, the blowing agent typically produces inert gasses that form as desired an open and/or closed cellular structure within the sealant material. In this manner, it may be possible to lower the density of articles fabricated from the material. In addition, the material expansion can help to improve sealing or wetting capability.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4,oxy-bis-(benzenesulphonylhydrazide), trihydrazinotriazine and N,N,-dimethyl-N, $N_i$dinitrosoterephthalamide. In a one embodiment, modified and unmodified azocarbonamides may be supplied to the material 10 in particle form having particles sizes of, for example, 120 and 180 microns. Advantageously, the azocarbonamides can assist the sealant material in leveling itself (i.e., forming a surface of maintaining the surface 24 in a substantially flat condition).

An accelerator for the blowing agents may also be provided in the sealant material. Various accelerators may be used to increase the rate at which the blowing agents form inert gasses. One preferred blowing agent accelerator is a metal salt, or is an oxide, e.g. a metal oxide, such as zinc oxide.

Amounts of blowing agents and blowing agent accelerators can vary widely within the sealant material depending upon the type of cellular structure desired, the desired amount of expansion of the sealant material, the desired rate of expansion and the like. Exemplary ranges for the amounts of blowing agents and blowing agent accelerators in the sealant material range from about 0% by weight to about 5% by weight and are preferably in the sealant material in fractions of weight percentages.

Curing Agent

One or more curing agents and/or curing agent accelerators may be added to the sealant material. Amounts of curing agents and curing agent accelerators can, like the blowing agents, vary widely within the sealant material depending upon the type of cellular structure desired, the desired amount of expansion of the sealant material, the desired rate of expansion, the desired structural properties of the sealant material and the like. Exemplary ranges for the curing agents, curing agent accelerators or both present in the sealant material range from about 0% by weight to about 7% by weight.

Preferably, the curing agents assist the sealant material in curing by crosslinking of the polymers, epoxy resins or both. It is also preferable for the curing agents to assist in thermosetting the sealant material. Useful classes of curing agents are materials selected from aliphatic or aromatic amines or their respective adducts, amidoamines, polyamides, cycloaliphatic amines (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines such as triethylenetetramine, diethylenetriamine tetraethylenepentamine, cyanoguanidine and the like. An accelerator for the curing agents (e.g., methylene diphenyl bis urea) may also be provided for preparing the sealant material.

Other preferred curing agents can include peroxides, such as bis(t-butylperoxy)diisopropylbenzene, 1,1-di-t-butylperoxy-3,3,5-trimethylcyclohexane, 4,4-di-t-butylperoxy n-butyl valerate, dicumyl peroxide, and the like.

It can also be desirable for one or more of the curing agents to be higher temperature curing agents. Such a curing agent is typically configured to cure and or crosslink polymers of the sealant material at a temperature that is at least 120° C., more typically at least 170° C. and possibly at least 200° C.

Filler

The sealant material may also include one or more fillers, including but not limited to particulated materials (e.g., powder), beads, microspheres, or the like. Preferably the filled includes a relatively low-density material that is generally non-reactive with the other components present in the sealant material.

Examples of fillers include silica, diatomaceous earth, glass, clay, talc, pigments, colorants, glass beads or bubbles, glass, carbon ceramic fibers, antioxidants, and the like. Such fillers, particularly clays, can assist the sealant material in leveling itself during flow of the material. The clays that may be used as fillers may include clays from the kaolinite, illite, chloritem, smecitite or sepiolite groups. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular can assist in leveling the sealant material.

When employed, the fillers in the sealant material can range from 10% to 90 % by weight of the sealant material. According to some embodiments, the sealant material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 40% to about 60%, and still more preferably approximately 55% by weight of the sealant material. In one highly preferred embodiment the sealant material may contain approximately 7% by weight mica.

Other Additives

Other additives, agents or performance modifiers may also be included in the sealant material as desired, including but not limited to a UV resistant agent, a flame retardant, an impact modifier, an adhesion promoter, a heat stabilizer, a colorant, a processing aid, a lubricant, a reinforcement (e.g., chopped or continuous glass, ceramic, aramid, or carbon fiber or the like). One preferred additive is an adhesion promoter such as a hydrocarbon resin. Another preferred additive is a coagent such an acrylate coagent.

Once formed, the sealant material typically has a melt temperature less than about 200° C., more typically less than about 140° C. and even more typically less than about 100° C., but typically greater than about 30° C., more typically greater than about 50° C. and even more typically greater than about 65° C., although higher or lower melt temperatures are possible depending upon the manner of application of the sealant material. The sealant material also typically has a glass transition temperature that is less than about 20° C., more typically less than about 0° C. and even more typically less than about –20° C., but typically greater than about –100° C., more typically greater than about –60° C. and even more typically greater than about –40° C., although higher or lower glass transition temperatures are possible depending upon the manner of application of the sealant material Table A below provides an exemplary sealant material according to the present invention.

TABLE A

| Ingredient | Wt. Percent |
| --- | --- |
| EMA | 47.9 |
| EVA Resin | 4 |
| Solid Epoxy Resin | 8.6 |
| Adhesion Promoter (Aliphatic Hydrocarbon Resin) | 5 |
| Calcium Carbonate Filler | 31.94 |
| High Temperature Peroxy Curing Agent | 0.3 |
| Carbon Black | 0.1 |
| Cyanoquanidine Curing Agent | 0.02 |
| Trifunctional Acrylate Coagent (ethoxylated bisphenol A diacrylate) | 2.14 |

Since the sealant material of Table A is merely exemplary, it is contemplated that the weight percents of the various ingredients may vary by ±50% or more or by ±30% or ±10%. For example, a value of 50±10% is a range of 45 to 55. Moreover, ingredients may be added or removed from the formulation.

Formation

The sealant material of the present invention may be formed using several different techniques. Preferably, the sealant material or at least a portion thereof has a substantially homogeneous composition within itself. However, it is contemplated that various combining techniques may be used to increase or decrease the concentration of certain components in certain locations of the portions of the sealant material or the sealant material itself.

According to one embodiment, the sealant material can be formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a single homogenous composition.

According to another embodiment, the materials of the sealant material may be processed by heating one or more of the components that is generally easier to soften or liquidize such as the polymer based materials to induce those components into a mixable state. Thereafter, the remaining components may then be intermixed with the softened components.

For mixing, a variety of mixers or other devices may be employed. For example, such devices can include, without limitation, an internal mixer, a kneader, a mill, a single or twin screw extruder, a planetary mixer, a compounding extruder, combinations thereof or the like.

Application

The sealant material may be applied to a variety of substrates. However, for exemplary purposes and with no intention of limiting the invention unless otherwise stated, the material of FIGS. 1A and 1B is shown as applied to components 14, 16 (e.g., overlapping panels) for forming a joint. The joint, as shown, is formed with overlapping ends 24 of the two components 14, 16. In one embodiment, the substrate is formed of a material that includes metal (e.g., steel, aluminum, iron, tin, magnesium, a combination thereof or the like), plastic (e.g., reinforced plastic), a combination thereof or the like.

As discussed, the sealant material 10 may be formed in a variety of shapes, sizes, patterns, thicknesses or the like and may be formed using a variety of forming techniques such as molding, extruding, thermosetting and the like. It is also contemplated that the sealant material or one of the portions thereof may be initially formed in a substantially liquid state wherein the material is shaped by its container or shaped by a substrate to which the material has been applied.

The sealant material may be dry to the touch shortly after it is initially formed to allow easier handling, packaging, application to a substrate and the like of the material, however, it is also possible for the material to be wet, tacky or both. As such, the sealant material may be placed adjacent a substrate either manually, automatically or semi-automatically. In one preferred embodiment, the sealant material is extruded directly onto the substrate that is to be sealed by the material. In another embodiment, the sealant material is manually applied as an insert.

Figure 2:
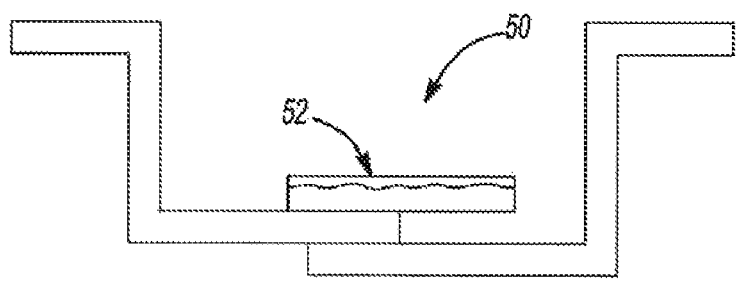
FIG. 2 illustrates a sectional view of another exemplary sealant material disposed upon an exemplary substrate in accordance with an aspect of the present invention.

In the embodiment illustrated in FIG. 2, the sealant material 10 is placed or located within the opening 30 (e.g., a cavity, ditch or recess) that is formed by the panels 14, 16. In the particular embodiment illustrated, the opening 30 is a roof ditch of an automotive vehicle that is typically formed from body panels of the vehicle. As shown, the overlapping ends 24 of the panels 14, 16 at least partially define the opening 30 and the overlapping ends 24 form an interface 34 between the two panels 14, 16. Typically, the interface 34 will define one or more gaps 36 between the overlapping ends 24 of the panels 14, 16, even though effort is typically expended to minimize such gaps 36 for articles of manufacture such as automotive vehicles.

For sealing a substrate, the sealant material is typically placed upon the substrate adjacent to a target location that is to be sealed. Generally, it is contemplated that the target location of the substrate may be any type of opening of the substrate such as a cavity, a recess, a gap or the like or may be a flat or contoured portion of the substrate.

In FIGS. 1A and 1B, the target location is the interface 34 and/or the one or more gaps 36 formed by the components 14, 16. As can be seen, the sealant material 10 is placed or located overlaying and/or adjacent the interface 34 and the one or more gaps 36 formed by the interface 34.

Once the sealant material has been formed in a desired configuration and located, as desired, relative to a substrate, the material may be activated to flow, expand, whet, seal, cure or a combination thereof to form a seal of a desired configuration. Activation of the sealant material, may take place in a single stage or multiple stages and may utilize a variety of stimuli to cause activation. Activation, as used herein, generally denotes inducing the sealant material to flow, generally soften, foam, expand, cure or a combination thereof and can be caused by exposure of the sealant material to a variety of stimuli such as heat, light, electricity, pressure, moisture and the like. Curing, as used herein, generally denotes any stiffening, hardening, solidifying or the like of the sealant material and can be caused by exposure to a variety of stimuli such as heat, cooling, light, moisture combinations thereof or the like.

According to one embodiment, the sealant material may be at least partially activated prior to application of the sealant material to a substrate such that the sealant material is in a generally flowable state when it is applied to the substrate. In such a situation, curing of the material may occur during or after the time the sealant material is applied to the substrate.

According to another embodiment, the sealant material may undergo a single stage activation, a single stage cure or both. According to still other embodiments, the sealant material may undergo a selective multiple stage activation, a multiple stage cure or both. For example, a portion of the sealant material may be exposed to a stimulus to at least partially cure a portion of the sealant material, e.g. a cure to a predetermined depth (e.g., on the order of about 1 mil to about 2 mm), or a cure in certain regions along or within the mass of material.

Upon activation, typically caused by exposure to heat or other stimulus, the first portion of the sealant material becomes more flowable than the second portion as previously described. Advantageously, this allows the first portion to flow over and seal the target location of the substrate while the second portion can maintain a surface suitable for various uses also previously described.

Additionally or alternatively, it is contemplated that a sealed joint prepared in accordance with the present invention can be further coated with a top coat (e.g., a paint) and optionally a primer (between the top coat and the joint), a clear coat (e.g., a polyurethane, an acrylic such as a glycidyl methacrylate (GMA)-based coating, or a mixture thereof) over the top coat, or a combination thereof. Preferably one such coating is a water-based coating, although solvent based coatings may also be used. In one embodiment, the coating includes a two component polyurethane coating. In another embodiment the coating is applied as a powder coating. Preferably an electrocoating process is used to apply a coating layer, such as an e-coat or other layer.

It is additionally or alternatively contemplated that the sealant material of the present invention may include a treated (e.g., a hardened or cured) surface. As can be seen in FIG. 2, there is illustrated an exemplary sealant material 50 that has at least one treated surface 52. Typically, the sealant material 50 will be treated to a depth below the treated surface 52, but such depth will typically depend upon the method of treating the surface 52.

In one embodiment, the surface 52 is chemically treated to partially or fully harden or cure the surface 52. For example, a curing agent, a curing agent accelerator or both may be coated (e.g., brushed, wiped, dripped, dabbed or the like) over the surface 52 of the material such that the surface cures and hardens. Exemplary curing agents could include amines, amides, acids, isocyanates, dicyandiamides, other curing agents or curing agent accelerators discussed herein or otherwise, combinations thereof or the like. Such partial or full curing or hardening will typically only extend to a shallow depth within the sealant material.

In another embodiment, the surface 52 is heat treated to partially or fully harden or cure the surface 52. For example, an energy source may expose the surface 52 to energy or heat for a limited period of time for thereby curing and hardening the surface 52. Exemplary energy sources, could in UV radiation sources (e.g., UV lamps), lasers, electromagnetic radiation sources, heating elements, combinations thereof or the like. Such partial or full curing or hardening will typically only extend to a shallow depth within the sealant material.

After or during treatment of the surface, the sealant material can be placed upon the substrate followed by activation and sealing of the sealant material as previously described. Prior to or during activation, the treated surface of the sealant material may be separated from the substrate by the remainder or thickness of the sealant material as shown in FIG. 2 or it may be directly adjacent or contacting the substrate. The sealant material can be activated as previously described and the surface will typically remain rigid during such activation. Advantageously, the surface can assist in confining or otherwise controlling any flow of the sealant material. Moreover, the surface can prevent bubbles from flowing to and/or through the treated surface or to another surface and forming surface irregularities (e.g., bubbles or the like) thereon.

In another embodiment, it is contemplated that a hardened or cured surface may be formed on the sealant material by coating or spraying a surface of the material with an at least partially liquidized solution. Typically, the solution will harden or cure upon the surface of the sealant material for providing the treated (e.g., hardened or cured) surface.

It is also contemplated that the sealant material may include multiple portions of the same or different material, which may be formed by extrusion, co-extrusion, tri-extrusion or other techniques. In a preferred embodiment, the sealant material includes a separate portion that is relatively hard or rigid compared to the rest of the sealant material or does not become flowable like the rest of the sealant material upon activation. The separate portion may be formed of relatively rigid polymeric material such a polyethylene terphthalate (PET), a metal material such as a foil (e.g., aluminum foil), a fabric, a mesh combinations thereof or the like.

Figure 3:
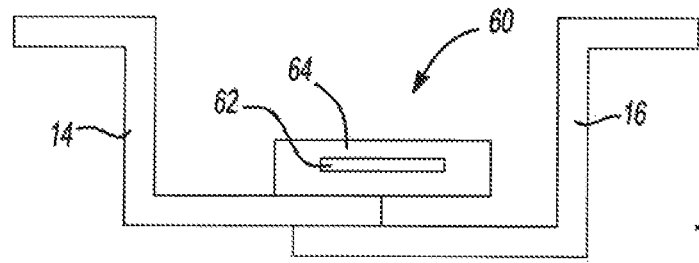
FIG. 3 illustrates a sectional view of another exemplary sealant material disposed upon an exemplary substrate in accordance with an aspect of the present invention.
Figure 4:
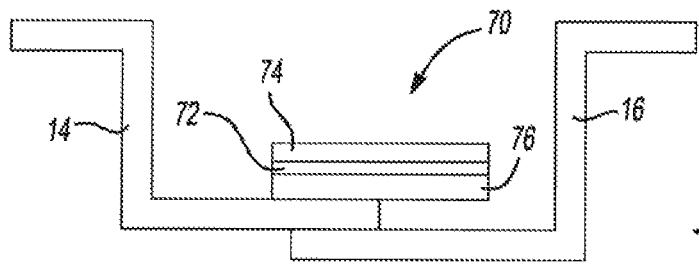
FIG. 4 illustrates a sectional view of another exemplary sealant material disposed upon an exemplary substrate in accordance with an aspect of the present invention.

As one example, in FIG. 3, there is a sealant 60 having a separate portion shown as a film or layer 62 that is substantially entirely encapsulated or surrounded by sealant material 64. Preferably, the sealant material 64 has been extruded about the film or layer 62. As another example, in FIG. 4 a sealant 70 is shown with a separate portion illustrated as a film or layer 72 that has been sandwiched between a first mass 74 and a second mass 76 of sealant material. Generally, it is contemplated that the sealants may be formed by pultrusion, extrusion (e.g., co-extrusion) or otherwise.

Figure 5:
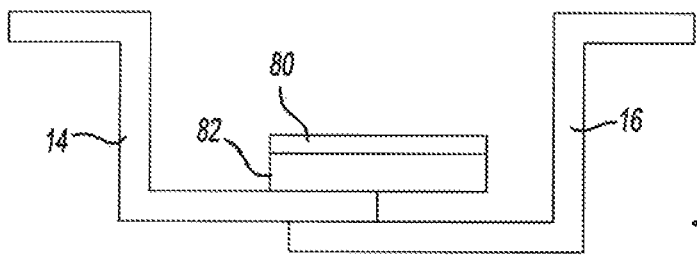
FIG. 5 illustrates a sectional view of another exemplary sealant material disposed upon an exemplary substrate in accordance with an aspect of the present invention.

In another embodiment, a sealant is formed by providing a separate portion formed of a material similar to the sealant material, but which has been formulated to exhibit different characteristics than the sealant material. For example, the separate portion may have a viscosity, prior to or during activation of the sealant material, that is at least 10%, more typically at least 30% and even more typically at least 80% greater than the viscosity of the sealant material. As another example, the separate portion may be formulated so as to, upon activation, substantially entirely cure in an amount of time that is less that 90% more typically less than 80% and even more typically less than 60% of the amount of time that it takes for the sealant material to substantially entirely cure. In FIG. 5 such a separate portion has been co-extruded as a film or layer 80 with a mass 82 of sealant material such that the film or layer 80 overlays the mass 82.

Advantageously, the separate portions of the sealants described can assist in preventing bubbles from moving to and/or forming irregularities upon one or more surfaces of the sealant material.

Figure 6:
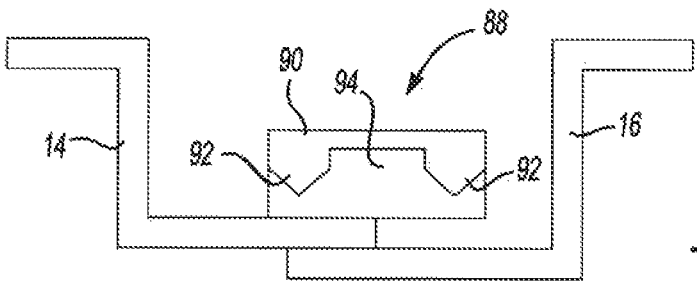
FIG. 6 illustrates a sectional view of another exemplary sealant material disposed upon an exemplary substrate in accordance with an aspect of the present invention.

It is also contemplated that the separate portion of the sealant material may have a more complex configuration. For example, in FIG. 6, there is illustrated a sealant 88 with a separate portion 90 that includes at least one, but preferably a pair of extensions 92 extending into an activatable portion 94 of the sealant 88.

In another additional or alternative embodiment, the sealant material may be formulated such that the sealant material, upon activation, exhibits a particular surface or interfacial energy, a particular curing characteristic, a particular degree of whetting, a particular viscosity or a combination thereof. Advantageously, such formulations can assist the sealant material in purging gas or air (e.g., bubble) that nucleate through or purge from the sides of the sealant material.

As one example, the sealant material is formulated such that the surface energy of sealant material, upon activation or in its softened, melted or flowable state, is relatively close to the surface energy of the substrate to which the sealant material has been applied. In such an embodiment, the surface energy of the sealant material is typically no more than 50% greater or less, more typically no more than 25% greater or less and even more typically not more than 10% greater or less than the surface energy of the substrate for purposes of clarification, a quantity of 110 is 10% greater than a quantity of 100 and a quantity of 90 is 10% less and like calculating may be made for other values. Ingredients which can assist the sealant material in attaining a desired surface energy include, without limitation, particulated polymeric materials such as particulated polytetrafluoroethylene (PTFE).

Figure 7:
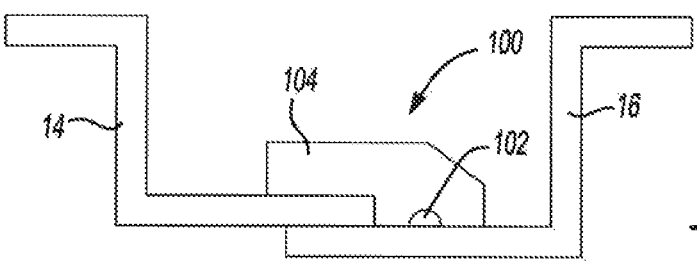
FIG. 7 illustrates a sectional view of another exemplary sealant material disposed upon an exemplary substrate in accordance with an aspect of the present invention.

In FIG. 7, a sealant material 100 is formulated such that its activation surface tension is relatively close to the surface energy of the substrate, which as shown are the panels 14, 16 that are preferably covered by e-coat. As depicted, a bubble 102 has formed during activation, upon the panel 14 between the sealant material 100 and the panel 14. Advantageously, since the surface tensions of the sealant material 100 and the panel 14 are relatively close to each other, the interfacial tension between the panel 14 and the sealant material 100 is lower than any interfacial tension between the bubble 102 and the panel 14, the bubble 102 is more likely to nucleate through or out by the sides of the sealant material 100 at a faster rate thereby purging the bubble prior to cure of the sealant material 100. As such, the bubble 102 is less likely to be caught upon or below a surface 104 of the material 100 and form any surface irregularities.

The sealant material may also be formulated to have a relatively low viscosity upon activation for a desired period of time thereby assisting in more rapid nucleation or expulsion of bubbles from the sealant material. Generally, the desired period of time is an amount of time long enough to purge the bubbles from the sealant material but short enough to prevent the sealant material from flowing to undesirable locations (e.g., off of the substrate). In such an embodiment, the sealant material, upon activation, will typically maintain its viscosity below about 10,000 centipoise for a period of time between about 5 seconds and about 20 minutes, more typically below about 5,000 centipoise for a period of time between about 15 seconds and about 5 minutes and even more typically below about 1000 centipoise for a period of time between about 30 seconds and 2 minutes.

Figure 8:
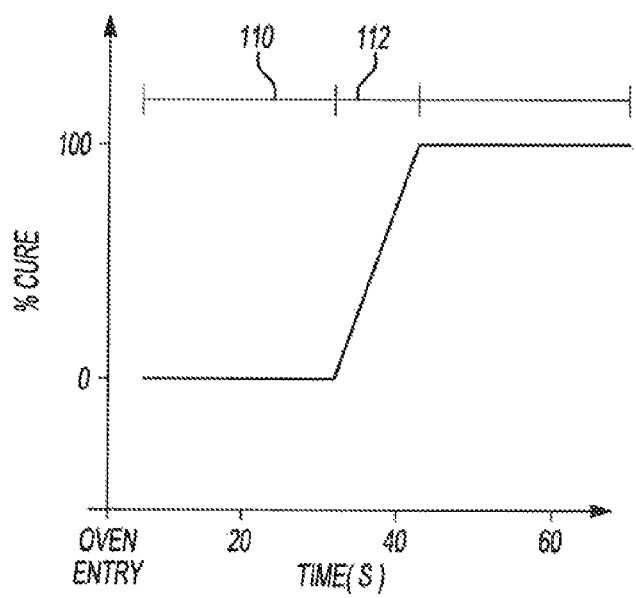
FIG. 8 is a graph of an exemplary response to heat exhibited by an exemplary sealant material.

Achieving such a relatively low viscosity can be accomplished by including one or more thermoplastics (e.g., polyamides), one or more waxes, one or more thermoplastic waxes, a combination thereof or the like in the sealant material. In one embodiment, the sealant material has a cure profile such as that modeled in FIG. 8 upon exposure to a stimulus such as heat. In FIG. 8, the sealant material is exposed to heat (e.g., by entry into an e-coat, primer, base coat or paint oven) and remains substantially uncured for a first period of time 110 followed by experiencing a substantially full cure over a second relatively short period of time 112. Preferably, the sealant material reaches its relatively low viscosity for a desired period of time during the first period of time.

One method of accomplishing a cure profile similar to that in FIG. 8 is by providing the sealant material with an encapsulated curing agent, curing agent accelerator or both. For example, a curing agent, a curing agent accelerator or both may be encapsulated in a thermoplastic shell wherein the shell melts upon exposure to the heat (e.g., in the e-coat, primer, base coat or paint oven) over a period of time (e.g., the first period of time 110) such that curing of the sealant material is essentially or substantially delayed for that period of time. However, after the melting of the thermoplastic shell or encapsulation, the curing agent, the curing agent accelerator or both can cure the sealant material over a second period of time (e.g., the second relatively short period of time 112).

In still other alternative or additional embodiments, it is contemplated that the sealant material may be formed in a variety of shape, sizes and configurations. Moreover, the sealant material may be located in variety of locations relative to the substrate to which it is applied.

Figure 9:
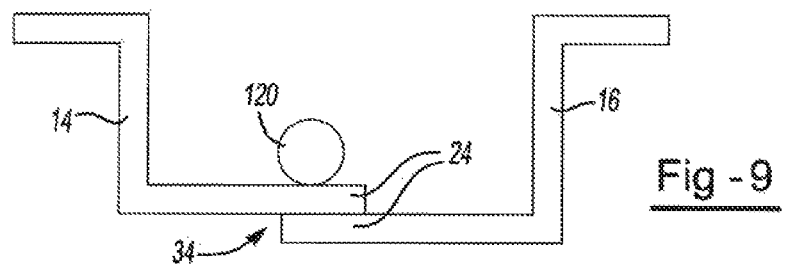
FIG. 9 illustrates a sectional view of another exemplary sealant material disposed upon an exemplary substrate in accordance with an aspect of the present invention.
Figure 10:
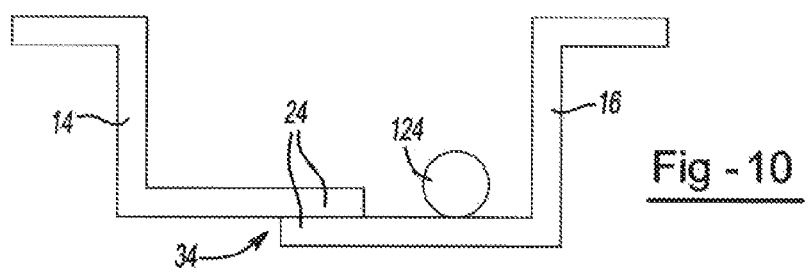
FIG. 10 illustrates a sectional view of another exemplary sealant material disposed upon an exemplary substrate in accordance with an aspect of the present invention.
Figure 11:
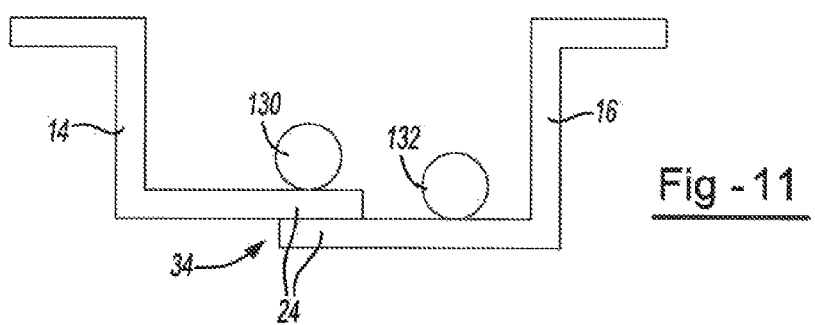
FIG. 11 illustrates a sectional view of another exemplary sealant material disposed upon an exemplary substrate in accordance with an aspect of the present invention.

In one embodiment, the sealant material of the present invention is applied to overlapping panels that form an interface. In FIGS. 9-11, strips of sealant material are applied to the overlapping panels 14, 16 that form the roof ditch such as was previously discussed. As shown, the strips are generally circular in cross-section, but may be configured as needed or desired. In each Figure, there is a first or upper panel 14 having an end portion 24 that overlaps an end portion 24 of the second or lower panel 16. In FIG. 9, a strip 120 of sealant material is located upon the first panel 14 and, upon activation, the strip 120 becomes flowable and flows over the interface 34 between the panels 14, 16 and contacts and whets the second panel 16 and then cures to seal the interface 34.

In FIG. 10, a strip 124 of sealant material is located upon the second panel 16 and, upon activation, the strip 124 becomes flowable and flows over the interface 34 between the panels 14, 16 and contacts and whets the first panel 14 and then cures to seal the interface 34. In FIG. 11, there is a first strip 130 of sealant material located upon the first panel 14 and the a second strip 132 of sealant material located upon the second panel 16. Upon activation, the first and second strip 130, 132 flow toward the interface 34 and converge upon each other to seal over the interface. Typically the embodiments of FIGS. 9-10 assist in allowing air to be purged away from the interface 34 at an earlier stage or more effectively during flow of the sealant material such that bubbles are less likely be trapped by the sealant material and/or form surface irregularities on the sealant material.

Figure 12:
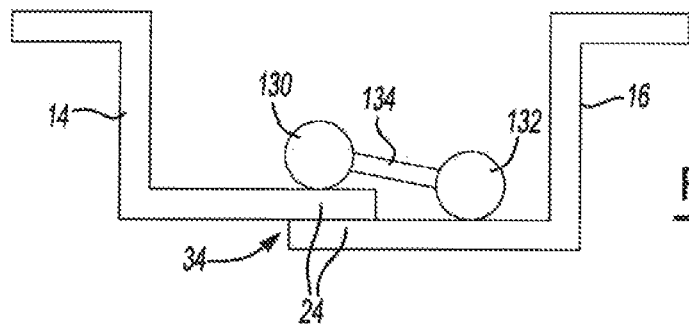
FIG. 12 illustrates a sectional view of another exemplary sealant material disposed upon an exemplary substrate in accordance with an aspect of the present invention.

In FIG. 12, the two strips 130, 132 as shown in FIG. 11 are interconnected by an intermediate member 134, which may be formed of the sealant material or another material. Typically, the strips 130, 132 of FIG. 12 operate to seal the interface as in FIG. 11, however, the member 134 can maintain a desired spacing between the strips 130, 132 during placement of the strips 130, 132 in the roof ditch and/or upon the panels 14, 16. Upon placement within a roof ditch, both strips may be supported by and or contact one of the or one of the strips can be supported by and or contact one panel and the other strip supported by the other panel.

Figure 18A:
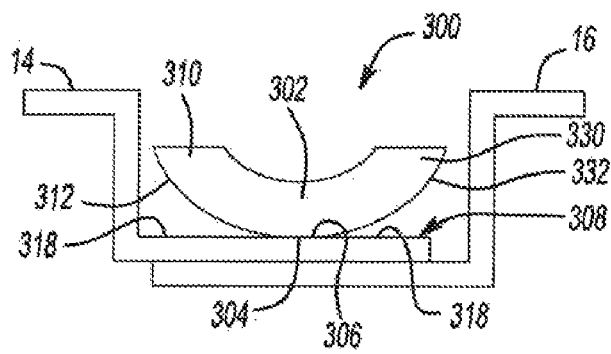
FIGS. 18A-18C illustrates a variety of exemplary sealant materials according to the present invention.
Figure 18B:
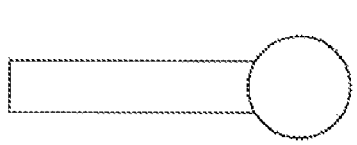
Figure 18C:
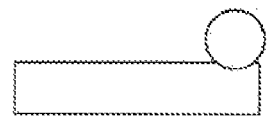

As shown in FIGS. 18B and 18C, it is possible for the sealant member to a have a single strip and a single member wherein, when viewing the cross-section, the strip is adjacent a distal end of the member and is located, atop, below or beside the member.

Figure 13:
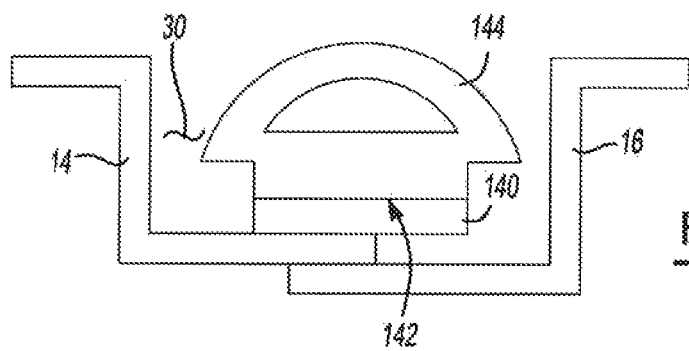
FIG. 13 illustrates a sectional view of another exemplary sealant material disposed upon an exemplary substrate in accordance with an aspect of the present invention.

In another additional or alternative embodiment, the sealant material may be attached to a trim piece or other component such that the trim piece or other component and the sealant material can be assembled to a substrate together. In FIG. 13, a strip 140 of sealant material is attached (e.g., adhered) to a surface 142 of a trim piece 144 and the trim piece 144 and strip 140 can be assembled together into the roof ditch 30 and onto one or both of the panels 14, 16. In such an embodiment, fasteners (e.g., adhesives or mechanical fasteners, spots of fast curing sealant material, combinations thereof or the like) may be used to hold the trim piece in place during activation of the strip 140 of sealant material such that the sealant material can cure and adhere to the surface 142 of the trim piece 144 and the panels 14, 16. Preferably, the trim piece 144, the sealant material or both are paintable (e.g., in a traditional automotive paint oven).

Figure 14:
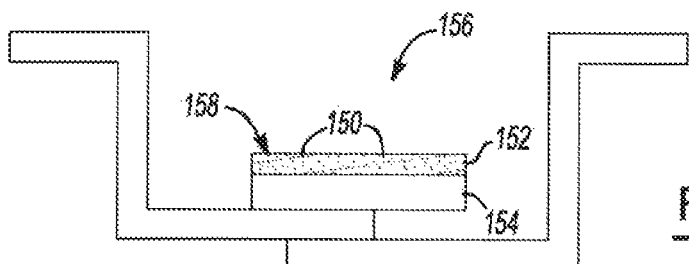
FIG. 14 illustrates a sectional view of another exemplary sealant material disposed upon an exemplary substrate in accordance with an aspect of the present invention.
Figure 15:
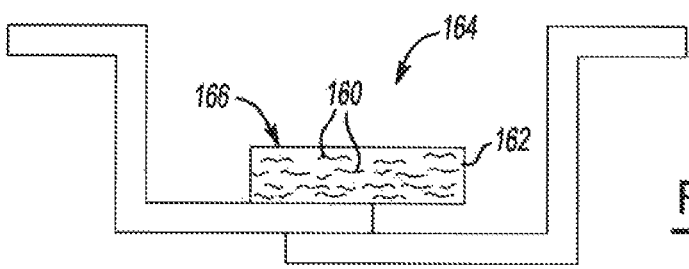
FIG. 15 illustrates a sectional view of another exemplary sealant material disposed upon an exemplary substrate in accordance with an aspect of the present invention.

In still another additional or alternative embodiment, the sealant material may include pieces (e.g., flakes, powder, chunks, fibers, spheres, platelets, combination thereof or the like) of blocking material for preventing bubbles from penetrating through the sealant material to an outwardly facing surface of the sealant material. Preferably, the pieces of material remain substantially solid during flow of the sealant material such that bubbles or air cannot penetrate to the pieces. For example, in FIG. 14, pieces 150 of blocking material, which may be flakes, chunks, powder or the like, are coated as a layer 152 over a surface of an activatable portion 154 of a sealant material 156 such that the layer 152 can prevent penetration of bubbles therethrough to a outwardly facing surface 158 of the layer 152 and/or sealant material 156. As another example, in FIG. 15, pieces 160 of blocking material, shown as flakes, are interspersed throughout an activatable portion 162 of a sealant material 164 such that bubbles are prevented from penetrating through the sealant material 164 to an outwardly facing surface 166 thereof. Exemplary materials, which may be used to form the pieces of blocking material include polyethyleneterephthalate (PTE), polyamides, glass, porous glass, ceramic, nanocomposites, nanoparticles, carbon black, feathers or the like, however, many other material may be used as well.

In another additional or alternative embodiment, it is contemplated that the sealant material may include a magnetic material. For example, a magnetic material such as magnetic flakes, powders, particles or the like may be included in the sealant material. Preferred magnetic particles for use in the present invention are ferrites, such as barium ferrite and strontium ferrite. Also preferred are iron oxides. One particularly preferred type of magnetic particle for use in the present invention is sold under the tradename HM406 "Starmag" ceramic powder, commercially available from Hoosier Magnetics, Inc., 65 Main Street, Postsdam, N.Y. 13676. The particle size of the magnetic particles is preferably between about 0.1 and 100 microns in diameter and more preferably from about 1 to about 10 microns, with the average magnetized particle size being preferably from about 0.5 to 10 microns, e.g., about 2 to about 5 microns. Advantageously, the magnetic material can assist in holding the sealant material in place upon a metal substrate (e.g., roof ditch panels) prior to, during and possibly after activation of the sealant material.

In other additional alternative embodiments, it is contemplated that the sealant material may be designed to have a relatively small contact surface for contacting a first portion of a surface of a substrate for supporting the sealant material on the substrate prior to activation of the sealant material. Typically, such a sealant material is additionally configured to, upon activation, flow and contact one or more additional second portions of the surface of the substrate progressively outward from the first portion. Typically, the second portions of the surface are at least 50%, more typically at least 100%, even more typically at least 150% and still more typically at least 200% of the amount of surface area represented by the first portion.

Figure 16:
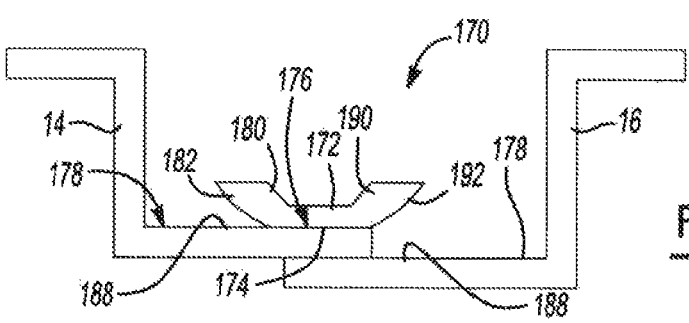
FIG. 16 illustrates a sectional view of another exemplary sealant material disposed upon an exemplary substrate in accordance with an aspect of the present invention.

As an example, in FIG. 16, there is illustrated a sealant material 170 having a central portion 172 with an initial contact surface 174 which is contacting a first portion 176 of a surface 178 of one or both of the panels 14, 16 forming a roof ditch. As shown, the sealant material 170 has a generally U-shape cross-section with a first flange 180 and surface 182 cantilevered over one second portion 188 of the surface 178 and a second flange 190 and surface 192 cantilevered over another second portion 188 of the surface 174. Upon activation of the sealant material, the flanges 180, 190 are typically progressively lowered such that the surfaces 182, 192 progressively contact the second portions 188 of the surface 178.

Figure 16A:
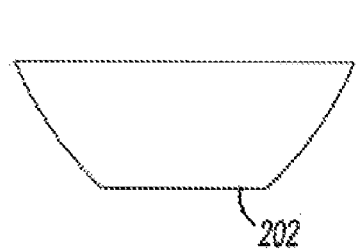
FIGS. 16A-16D illustrates a variety of exemplary sealant materials according to the present invention.
Figure 16B:
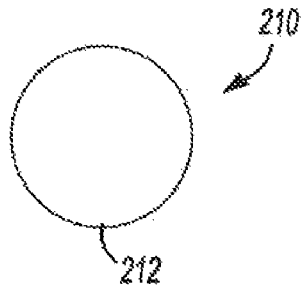
Figure 16C:
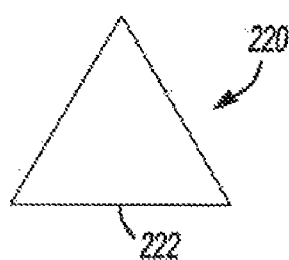
Figure 16D:
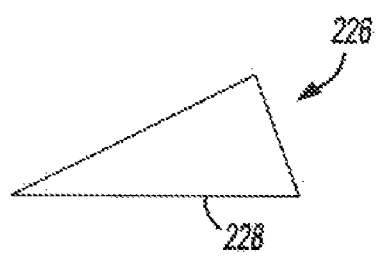

Other embodiments, which may seal in a similar manner to that of the sealant material of FIG. 16 are illustrated in FIGS. 16A-16D. In FIG. 16A there is illustrated a sealant material 200 with an initial contact surface 202 and a cross-section that is a truncated triangle or trapezoid. In FIG. 16B, there is illustrated a sealant material 210 with an initial contact surface 222 and a circular cross-section. In FIG. 16C, there is illustrated a sealant material 220 with an initial contact surface 222 and a triangular cross-section. Advantageously, such embodiments can assist the sealant materials in purging air to the sides of the sealant material upon activation. In FIG. 16D, there is illustrated a sealant material 226 with an initial contact surface 228 and a triangular cross-section that is asymmetrical as compared to the symmetrical cross-section of FIG. 16C.

Figure 17:
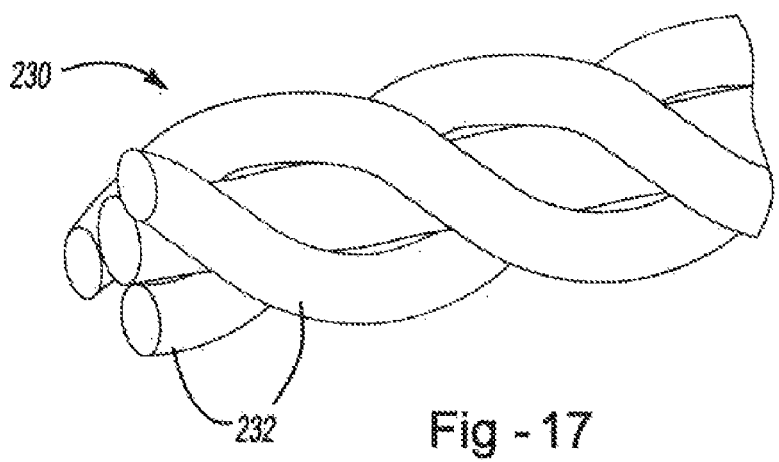
FIG. 17 illustrates a sectional view of another exemplary sealant material disposed upon an exemplary substrate in accordance with an aspect of the present invention.

In yet another additional or alternative embodiment shown in FIG. 17, there is illustrated a sealant material 230 composed of multiple strands 232 (e.g., 2, 3, 4 or more) which are woven together, for instance, in a licorice-like or braided configuration. It is believed that such an embodiment provides multiple passageways for air to be purged from the sealant material upon activation thereof.

With reference to FIG. 18A, there is illustrated another embodiment that can function like the sealant in FIG. 16. As can be seen, there is illustrated a sealant material 300 having a central portion 302 with an initial contact surface 304 which is contacting a first portion 306 of a surface 308 of one or both of the panels 14, 16 forming a roof ditch. As shown, the sealant material 300 has a generally U-shape cross-section with a first flange 310 and surface 312 cantilevered over one second portion 318 of the surface 308 and a second flange 330 and surface 332 cantilevered over another second portion 318 of the surface 308. Upon activation of the sealant material, the flanges 310, 330 are typically progressively lowered such that the surfaces 312, 332 progressively contact the second portions 318 of the surface 308.

Figure 19:
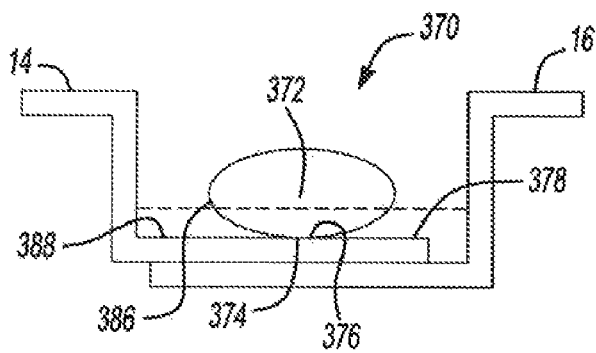
FIG. 19 illustrates a sectional view of another exemplary sealant material according to an aspect of the present invention.

With reference to FIG. 19, there is illustrated another embodiment that can function like the sealant in FIG. 16. As can be seen, there is illustrated a sealant material 370 having a central portion 372 with an initial contact surface 374 which is contacting a first portion 376 of a surface 378 of one or both of the panels 14, 16 forming a roof ditch. As shown, the sealant material 370 has a generally round or oval shaped cross-section with a first surface 386 cantilevered over one second portion 388 of the surface 378 and a second surface 392 cantilevered over another second portion 388 of the surface 378. Upon activation of the sealant material, the surfaces 386, 392 are typically progressively lowered such that they progressively contact the second portions 388 of the surface 378. It is possible, although not necessarily required, that the roof ditch or other area to be sealed be filled with the sealant material according to the dashed line.

Figure 20:
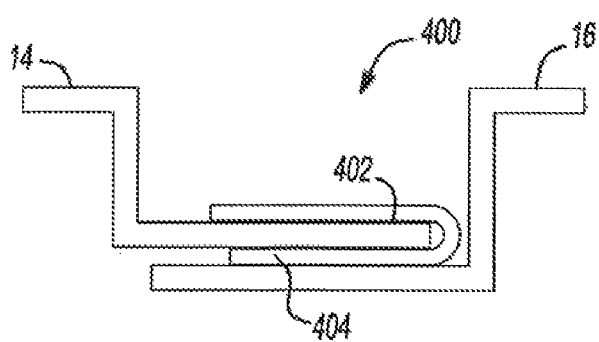
FIG. 20 illustrates a sectional view of another exemplary sealant material according to an aspect of the present invention.

With reference to FIG. 20, it is also contemplated that the sealant 400 can wrap about a distal end 402 of one of the panels 14, 16 and have a portion 404 disposed within a gap between the panels 14, 16.

Generally, it is contemplated that for any of the embodiments discussed herein, a fastener (e.g., a mechanical fastener, an adhesive, a tape or the like) may be employed to at least temporarily hold the sealant material in place until activation. For example, a tape (e.g., a pressure sensitive or double sided tape) may be employed to at least temporarily adhere the sealant material to a substrate. Such a tape may be used at ends (e.g., adjacent A, C or D pillars for an automotive vehicle) of the sealant material or at middle portions of the sealant material and may be employed to hold the sealant material in place, restrict flow of the sealant material or both.

In one embodiment, it is contemplated that the sealant material may be tacky or pressure sensitive and may be provided upon a release film or release tape. In such and embodiment, an individual or machine could handle or contact the release film or tape in a manner that allows one side of the sealant material to be contacted and adhered to a substrate. Thereafter, the release film or tape can be removed from the sealant material and the sealant material will be held in place by tackiness of the sealant material. In such an embodiment, it may be preferable to provide the sealant material as a roll with the release tape thereon such that the sealant material can be rolled onto the substrate.

When used in automotive applications (e.g., in a roof ditch), the sealant material may be applied to the vehicle after exposure of the vehicle to the electrocoat bake oven but prior to exposure of the vehicle to the paint bake oven. In such an embodiment, the sealant material will typically be configure to melt, soften, cure or a combination thereof in the paint bake oven. The sealant material may also be applied after the paint bake oven and be configured to cure in separate operation. However, for a higher temperature curing material, it is preferable for the sealant material to be applied prior to exposure of the vehicle to the electrocoat oven and for the sealant material to be configure to soften, melt, cure of a combination thereof in the electrocoat oven.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come

What is claimed is:

1. A sealant material comprising:
   a. an acrylate copolymer from about 30% to about 70% by weight of the sealant material;
   b. an acetate copolymer from about 1% to about 10% by weight of the sealant material;
   c. an epoxy resin from about 2% to about 50% by weight of the sealant material;
   d. masses of blocking material;
   e. one or more curing agents from about 0.0% to about 7% by weight of the sealant material; and
   f. one or more fillers from about 5% to about 60% by weight of;
   wherein the sealant material is capable of flowing and the masses for blocking material are capable of preventing bubbles from penetrating through the sealant material to an outwardly facing surface of the sealant material; and
   wherein the acrylate copolymer is ethylene methacrylate copolymer with ethlene methyl acrylate copolymer.

2. The sealant material of claim 1, wherein the acetate copolymer is ethylene vinyl acetate copolymer.

3. The sealant material of claim 2, wherein the epoxy resin includes Bisphenol-A.

4. The sealant material of claim 1, wherein the masses for blocking bubbles are formed at least partially of polyethyleneterephthalate, polyamides, glass, porous glass, ceramic, nanocomposites, nanoparticles, carbon black, feathers, or any combination thereof.

5. The sealant material of claim 1, wherein the one or more curing agents is present in a range of about 0.0% to about 4% by weight of the sealant material.

6. The sealant material of claim 5, wherein the one or more curing agents includes bis(t-butylperoxy)diisopropylbenzene, 1,1-di-t-butylperoxy-3,3,5-trimethylcyclohexane, 4,4-di-t-butylperoxy n-butyl valerate, dicumyl peroxide, triethylenetetramine, diethylenetriamine tetraethylenepentamine, cyanoguanidine, or any combination thereof.

7. The sealant material of claim 6, wherein the one or more curing agents includes about 0.05% to about 2.0% by weight of a first curing agent having 4,4-di-t-butylperoxy n-butyl valerate or dicumyl peroxide, and about 0.01% to about 2.0% by weight of a second curing agent having cyanoguanidine.

8. The sealant material of claim 1, wherein the one or more fillers includes calcium carbonate, sodium carbonate, mica, or a combination thereof.

9. The sealant material of claim 1, wherein the sealant material further comprises:
   i) an acrylate coagent;
   ii) an accelerator for the one or more curing agents that includes a dimethyl urea;
   iii) an adhesion promoter that includes an aliphatic hydrocarbon resin;
   iv) an epoxy/elastomer adduct that includes about 1:5 to 5:1 parts of epoxy to elastomer; or
   v) any combination thereof.

10. The sealant material of claim 1, wherein the masses of blocking material remain substantially solid during flow of the sealant material such that bubbles or air cannot penetrate to the masses of blocking material.

11. The sealant material of claim 1, wherein the sealant material has a melt temperature that ranges from about 65° C. to about 140° C.

12. The sealant material of claim 1, wherein the sealant material has a glass transition temperature that ranges from about 0.0° C. to about -60° C.

13. The sealant material of claim 1, wherein the sealant material has a curing temperature that ranges from about 120° C. to about 170° C.

14. The sealant material of claim 1, wherein the sealant material has a curing temperature that ranges from about 170° C. to about 200° C.

15. A sealant material comprising:
   a. an acrylate copolymer from about 45% to about 60% by weight of the sealant material;
   b. an acetate copolymer from about 2% to about 6% by weight of the sealant material;
   c. an epoxy resin from about 5% to about 30% by weight of the sealant material;
   d. masses of blocking material, the masses for blocking material are formed at least partially of polyethyleneterephthalate, polyamides, glass, porous glass, ceramic, nanocomposites, nanoparticles, carbon black, feathers, or any combination thereof;
   e. one or more filler from about 20% to about 45% by weight of the sealant material; and f. one or more curing agents from about 0.0% to about 7% by weight of the sealant material;
   wherein the masses of blocking material are formed as a layer over a surface of an activatable portion of the sealant material;
   wherein the sealant material is capable of flowing and the masses for blocking material are capable of preventing bubbles from penetrating through the sealant material to an outwardly facing surface of the sealant material; and
   wherein the masses of blocking material remain substantially solid during flow of the sealant material such that bubbles or air cannot penetrate to the masses of blocking material.

16. The sealant material of claim 15, wherein:
   i) the epoxy resin includes Bisphenol-A;
   ii) the one or more fillers includes calcium carbonate, sodium carbonate, mica, or a combination thereof;
   iii) the one or more curing agents includes bis(t-butylperoxy)diisopropylbenzene, 1,1-di-t-butylperoxy-3,3,5-trimethylcyclohexane, 4,4-di-t-butylperoxy n-butyl valerate, dicumyl peroxide, triethylenetetramine, diethylenetriamine tetraethylenepentamine, cyanoguanidine, or any combination thereof;
   iv) the sealant material further includes an acrylate coagent; and
   v) the sealant material further includes an accelerator for the one or more curing agents that includes a dimethyl urea, an adhesion promoter that includes an aliphatic hydrocarbon resin, or a combination of both.

17. The sealant material of claim 16, wherein the sealant material has a curing temperature that ranges from about 120° C. to about 135° C.

18. The sealant material of claim 16, wherein the sealant material has a curing temperature that ranges from about 170° C. to about 195° C.

19. A sealant material comprising:
   a. an ethylene methyl acrylate copolymer from about 45% to about 60% by weight of the sealant material;
   b. an ethylene methyl acrylate copolymer from about 2% to about 6% by weight of the sealant material;
   c. an epoxy resin that includes Bisphenol-A from about 5% to about 15% by weight of the sealant material;
   d. masses of blocking material that are formed at least partially of polyethyleneterephthalate;

e. one or more fillers that include calcium carbonate from about 20% to about 40% by weight of the sealant material;
f. one or more curing agents that include 4,4-di-t-butylperoxy n-butyl valerate or dicumyl peroxide from about 0.0% to about 5% by weight of the sealant material and cyanoguanidine;
g. an acrylate coagent;
h. an accelerator for the one or more curing agents that includes a dimethyl urea, an adhesion promoter that includes an aliphatic hydrocarbon resin or a combination of both;

wherein the masses of blocking material are formed as a layer over a surface of an activatable portion of the sealant material;

wherein the sealant material is capable of flowing and the masses for blocking material are capable of preventing bubbles from penetrating through the sealant material to an outwardly facing surface of the sealant material; and wherein the masses of blocking material remain substantially solid during flow of the sealant material such that bubbles or air cannot penetrate to the masses of blocking material.

20. The sealant material of claim 19, wherein the sealant material has a curing temperature that ranges from about 120° C. to about 135° C. or from about 170° C. to about 195° C.

* * * * *

UNITED STATES PATENT AND TRADEMARK OFFICE
CERTIFICATE OF CORRECTION

| | | |
|---|---|---|
| PATENT NO. | : 7,838,589 B2 | Page 1 of 1 |
| APPLICATION NO. | : 11/686487 | |
| DATED | : November 23, 2010 | |
| INVENTOR(S) | : Terry Finerman et al. | |

It is certified that error appears in the above-identified patent and that said Letters Patent is hereby corrected as shown below:

Column 18, claim 15, lines 23, 24: should read:

". . . weight of the sealant material; and
f. one or more curing agents from about . . ."

Signed and Sealed this
First Day of February, 2011

David J. Kappos
*Director of the United States Patent and Trademark Office*